(12) United States Patent
Leach et al.

(10) Patent No.: US 8,484,755 B2
(45) Date of Patent: Jul. 9, 2013

(54) MICROPROBE, MEASUREMENT SYSTEM AND METHOD

(75) Inventors: Richard Leach, Middlesex (GB); Ben Hughes, Middlesex (GB); Alan Wilson, Middlesex (GB)

(73) Assignee: The Secretary of State for Innovation, Universities and Skills, London (GB)

( * ) Notice: Subject to any disclaimer, the term of this patent is extended or adjusted under 35 U.S.C. 154(b) by 216 days.

(21) Appl. No.: 12/742,813

(22) PCT Filed: Nov. 17, 2008

(86) PCT No.: PCT/GB2008/003846
§ 371 (c)(1),
(2), (4) Date: Nov. 9, 2010

(87) PCT Pub. No.: WO2009/063217
PCT Pub. Date: May 22, 2009

(65) Prior Publication Data
US 2011/0047661 A1   Feb. 24, 2011

(30) Foreign Application Priority Data

Nov. 15, 2007  (GB) .................................. 0722477.7

(51) Int. Cl.
*G01Q 20/00*  (2010.01)
(52) U.S. Cl.
USPC .................................. 850/5; 250/306; 73/105

(58) Field of Classification Search
USPC ............................................................. 850/5
See application file for complete search history.

(56) References Cited

U.S. PATENT DOCUMENTS

| 7,268,348 B2 * | 9/2007 | Binning et al. | 250/306 |
| 2002/0021139 A1 * | 2/2002 | Jackson | 324/762 |
| 2007/0194225 A1 * | 8/2007 | Zorn | 250/306 |

FOREIGN PATENT DOCUMENTS

| EP | 1760422 | 3/2007 |
| JP | 2001 091206 | 4/2001 |
| NL | 1010894 | 6/2000 |
| WO | WO 02/068904 | 9/2002 |

OTHER PUBLICATIONS

Stoyanov, S. et al., Modelling and prototyping the conceptual design of 3D CMM micro-probe, Proceeding—2008 2$^{nd}$ Electronics System Integration Technology Conference, ESTC—Proceedings—2008 2$^{nd}$ Electronics System Integration Technology Conference, ESTC 2008 Inst. Of Elec. And Elec. Eng. Computer Society US, 2008, pp. 193-198.

* cited by examiner

*Primary Examiner* — Phillip A Johnston
(74) *Attorney, Agent, or Firm* — Leason Ellis LLP

(57) ABSTRACT

A microprobe, measurement system and method are disclosed. The microprobe includes a probe tip mounted at a meeting point of a plurality of flexures. The probe tip is moveable upon flexing of one or more of the flexures, each flexure further comprising one or more actuators controllable to flex the flexure and one or more sensors arranged to sense flexing of the flexure.

20 Claims, 9 Drawing Sheets

MICROPROBE, MEASUREMENT SYSTEM AND METHOD

CROSS REFERENCE TO REALATED APPLICATIONS

This patent application is a National Stage Application under 35 U.S.C. 371 of Application No. PCT/GB2008/003846, filed on Nov. 17, 2008, which claims benefit of Great Britain Application Serial No. 0722477.7, filed Nov. 15, 2007, which are hereby Incorporated by reference in there entirety herein.

FIELD OF THE INVENTION

The present invention relates to a microprobe that is particularly applicable for use in co-ordinate measurement to a high degree of accuracy of feature on objects of millimeter or smaller sizes.

BACKGROUND TO THE INVENTION

There is a continuing desire within industry to reduce object sizes yet maintain a high degree of accuracy for those objects and features of those objects.

For example, items such as the nozzles from inkjet printers, injector holes for diesel engines and the like are becoming increasingly complex and increasingly small. It is important that the channels that define the nozzles, holes and the like are a smooth as possible and correspond to the intended design. However, with the increasing reduction in size of the channels, conventional technology is no longer appropriate for measuring roughness and form.

Known measurement systems include those which attempt to measure a surface from above the channel or hole in question. However, whilst these systems can measure the diameter and depth of the channel, they cannot measure the roughness or form of the channel's sidewalls. For example, if scalloping exists from production of the channel, such systems are unlikely to identify this.

Another known technique is destructive testing in which the object is chopped in two and measured from the side. Whilst this does enable all the necessary characteristics to be measured, it is exceptionally expensive and also results in destruction of the object being measured. Clearly, this would require the production line to produce exactly identical objects, otherwise there would be a question over whether the tested object in fact corresponds to others produced on the production line. Research and Development companies typically have to cut up high aspect ratio silicon structures ultimately used as cantilevers so that they can inspect them using a scanning electron microscope, SEM. This currently costs upwards of £10,000 per wafer which, for anything but a major product, is too high and often means such testing is skipped.

For many years, co-ordinates measuring machines, CMMs, have been applied to metrology of 3D objects. A CMM typically uses a probe that operates in three dimensions and is calibrated to a pre-determined degree of accuracy such that the position of the probe tip is known within that degree of accuracy. An object to be measured is placed within the working volume of the CMM and the probe is guided either automatically or by an operator around the object. The geometry and other features of the object are measured whenever the probe tip encounters the object's surface.

However, whilst CMMs are considered useful general purpose tools, they typically operate within volumes around 0.1 $m^3$ to several cubic meters and have relatively large probes and probe tips. As such, conventional CMMs are not particularly applicable to use on objects of millimeter or sub-millimeter scale and indeed cannot normally be calibrated to a level of accuracy required for measuring such objects.

Whilst there have been attempts made to reduce the size of CMMs, one particular complication that has arisen is that when they are reduced in scale, the conventional probe and probe tip typically becomes too thin to be useful as a contact sensing measuring device.

There is a lack of suitable metrology solutions for measurement of high aspect ratio micro-scale components. There are commercially available probes, but as they operate in a de mode or vibrate in one axis only their measurement versatility is limited and they can suffer from low speeds stiction, high probing forces and contamination.

One form of microscopy tool that has been suggested for use in surface measurement in very small scale objects is based on an oscillating probe tip. Examples of such systems are described in U.S. Pat. No. 6,666,075 and also in US 2007/0056362. In such systems, an oscillating probe formed of an elongated rod having a free probe end and a second end attached to an oscillator is used to identify topography or composition of a surface of interest by scanning probe microscopy. Typically, the probe tip is oscillated such that the free end moves in a particular shape to define a virtual probe tip that is then scanned across the surface to be measured. Whilst such systems avoid the issue of the probe being too thin to enable accurate force feedback measurements, their implementations are somewhat limited due to the complex manner in which interactions with the oscillating rod are measured.

STATEMENT OF THE INVENTION

According to an aspect of the present invention, there is provided a microprobe including a probe tip mounted at a meeting point of a plurality of flexures, whereby the probe tip is moveable upon flexing of one or more of the flexures, each flexure further comprising one or more actuators controllable to flex the flexure and one or more sensors arranged to sense flexing of the flexure.

The microprobe may further comprise mounting means at the opposing end of the flexures to that of the meeting point for mounting the microprobe to a support.

Preferably, the microprobe comprises 3 flexures each diverging from the meeting point. The angle between each flexure and the, next respective flexure at the meeting point may be approximately 120°. Preferably, the flexures are substantially co-planar when non-flexed.

Each of the sensors is preferably arranged to sense a change in one or more of amplitude, phase and/or frequency of vibration of its respective flexure.

The microprobe may further comprise a probe stylus wherein the probe tip is mounted to the probe stylus, the probe stylus being mounted to the meeting point. The probe stylus may include an upper portion which is thicker than the lower portion. The probe tip may be substantially spherical. The probe tip may have approximately a 25 micron radius.

The microprobe may further comprise interface means for interfacing with a micro Co-ordinate Measurement system.

Each actuator may include a piezo-electric element.

Each sensor may include a piezo-electric element.

Each flexure may comprise a first leg part and a second leg part, the first leg part being substantially non-flexible and the second leg part forming the flexible portion of the flexure.

Each flexure may be formed from a selected one of plastic, nickel, glass carbon, silicon, or another material with a similar elastic modulus.

According to another aspect of the present invention, there is provided a measurement method using the microprobe as described herein, the method comprising:

applying a drive signal to one or more of the actuating elements to cause the probe tip to oscillate in a defined path creating a virtual probe tip;

monitoring one or more of the sensors to identify interaction of the virtual probe tip with a surface, the interaction producing a change in the output signal from one or more of the sensors; and, interpreting the output signals from the sensors to obtain information on probing force and contact direction According to another aspect of the present invention, there is provided a measurement system comprising:

a microprobe mounted to a support, the microprobe including a probe tip mounted at a meeting point of a plurality of flexures, whereby the probe tip is moveable upon flexing of one or more of the flexures, each flexure further comprising one or more actuators controllable to flex the flexure and one or more sensors arranged to sense flexing of the flexure, the microprobe being mounted to the support at a free end of each of the flexures, the measurement system further comprising a control system and a voltage source, the voltage source being connectable to the actuators for flexing the flexures and the control system being arranged to communicate with the sensors to receive data on sensing of flexing.

The control system may be arranged to control the voltage source to flex the flexure to move the probe tip in a predetermined path.

The microprobe may vibrate or oscillate the probe tip to form a virtual probe tip. Interactions between the virtual probe tip and a surface or other artefact to be measured can be detected by the sensors. By keeping the probe tip and stem relatively stiff (sufficiently stiff that the probe stem does not bend due to the vibration) the present invention seeks to provide precise control over what the probe is doing. Additionally, by the use of multiple flexures preferably 3, multi-axis operation is possible, something which is lacking in many prior art microprobe implementations.

Embodiments of the present invention provide a miniature, high accuracy, contacting element capable of making measurements of high aspect ratio features such as those typically found on MEMS type components. The probe element consists of a flexure structure with integrated sensing and actuating elements, supporting a ball-ended probe stylus. It will be appreciated that the stylus need not necessarily be ball-ended (or have any different end shape at all).

Application of appropriate drive signals to the actuating elements causes the probe tip to oscillate in a defined path, creating a virtual probe tip in 1, 2 or three dimensions. Interaction of the virtual probe tip with a surface will produce a change in the output signals from the flexure sensing elements, with subsequent interpretation of the signals providing information on probing force and contact direction. Preferably, the probe element will be packaged in such a way so as to make it compatible with commercially available micro-CMM systems.

Embodiments of the present invention when implemented as a vibrating probe may additionally provide the following benefits:

Minimising the effect of dirt on the item being measured—a serious problem for static probes.

Minimising the probing force needed—only a change in vibration amplitude and/or phase and/or frequency needed for detection.

Minimising the effect of a fluid film on the surface of the object being measured.

Potential markets include the following:

Small optics—aspherics, freeform, fibre optics, DVD lenses, Fθ lenses, opthalmics, conformal optics, electromagnetic integration and alignment Micro-optics—micro-lenses, micro-mirror geometry and alignment Millimetric components—electrical connectors, medical stents, cannular connectors, small gears Packaging—package geometry and alignment 3D integration—sensors, electronics, package, test structures Micro-fluidics—channel roughness, form, scalloping, re-entrant features, bottom notches MEMS structures—high aspect ratio form, roughness, pillars, holes, nozzles, micro-gears, cantilevers, actuators The proposed probe is expected to significantly reduce testing costs and avoid destroying structures to be tested/analysed.

A BRIEF DESCRIPTION OF THE DRAWINGS

Embodiments of the present invention will now be described in detail, by way of example only, with reference to the accompanying drawings in which.

Figure 1:
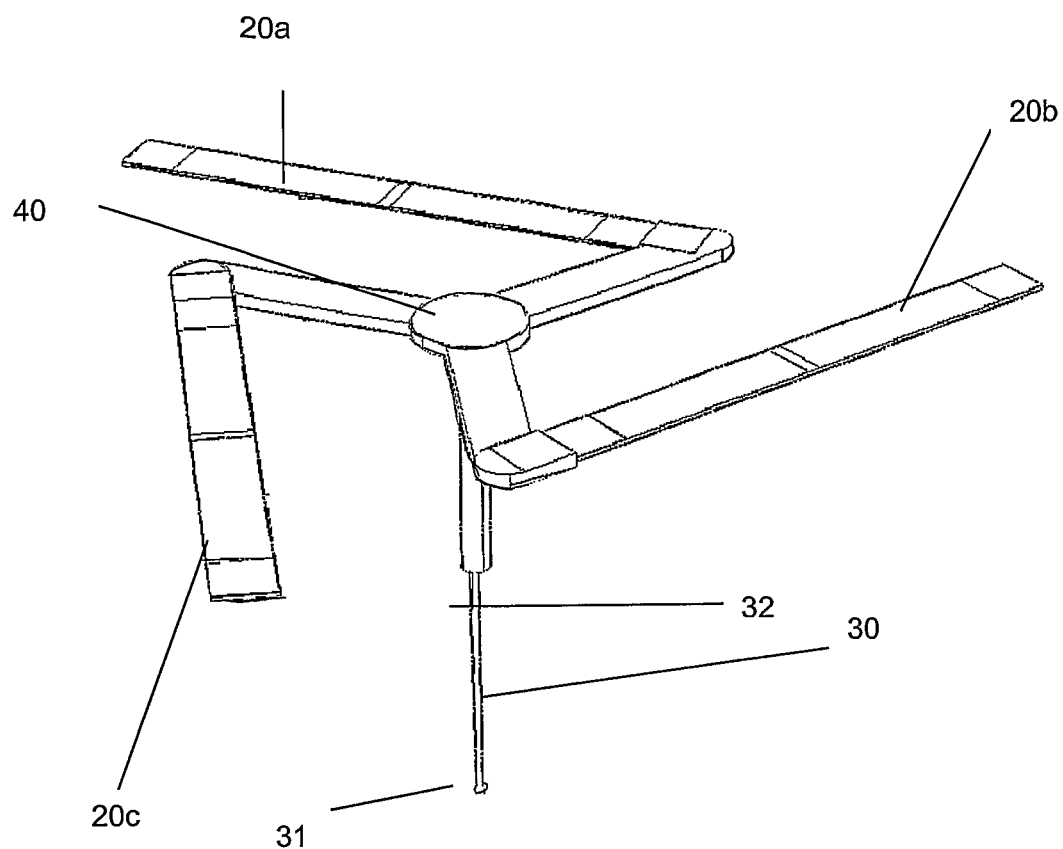
FIGS. 1 and 2 are perspective views of a microprobe according to an embodiment of the present invention.
Figure 2:
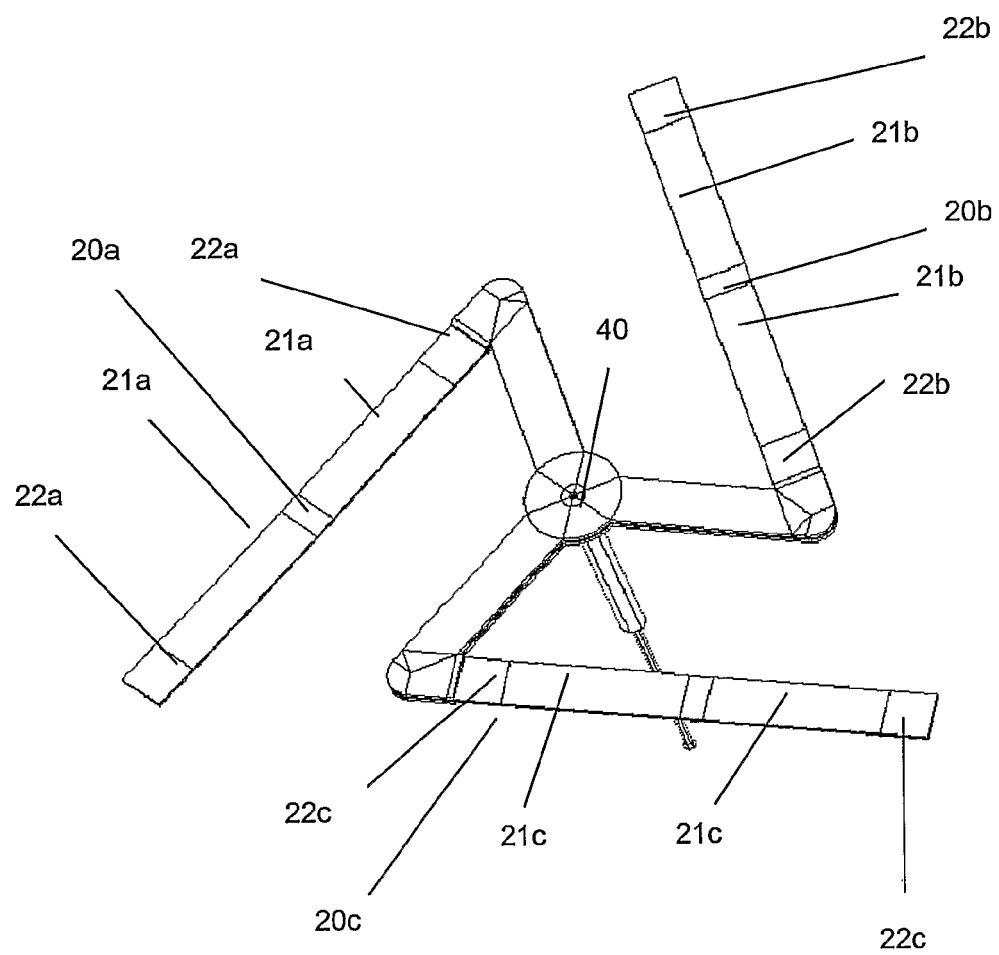
Figure 5:
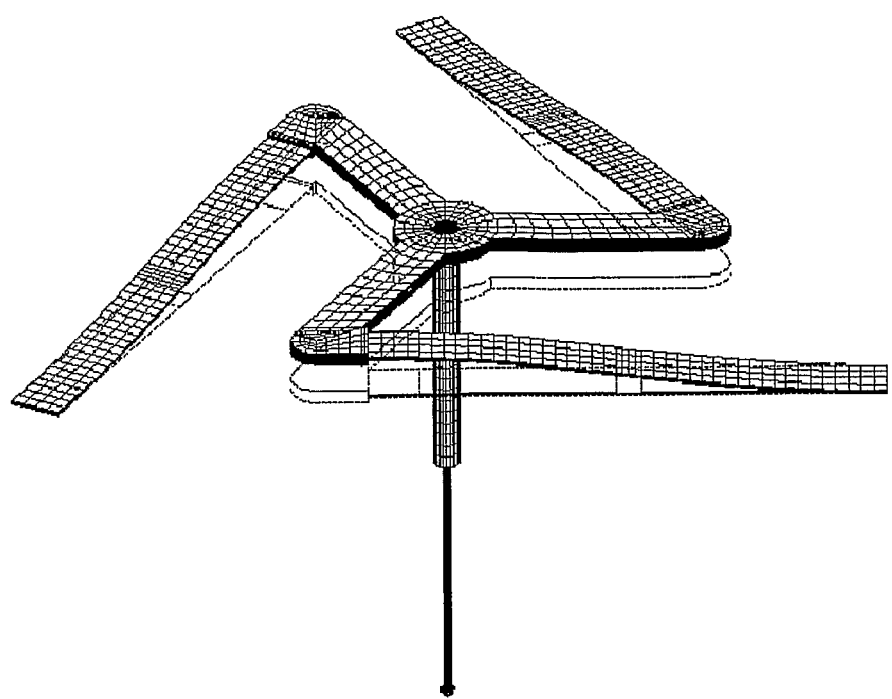
Figure 6:
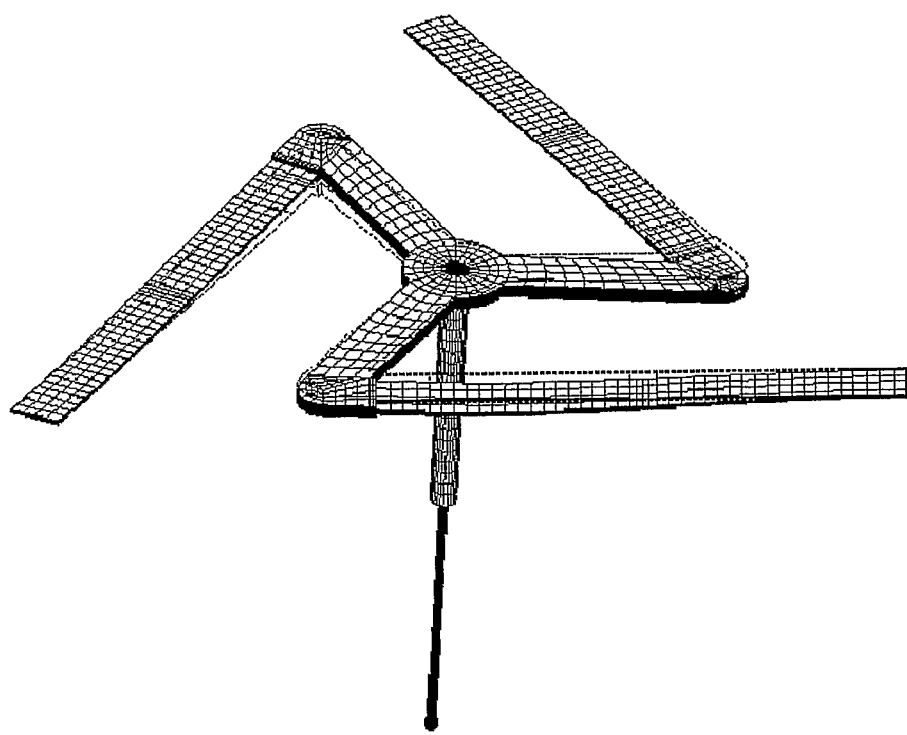
Figure 7:
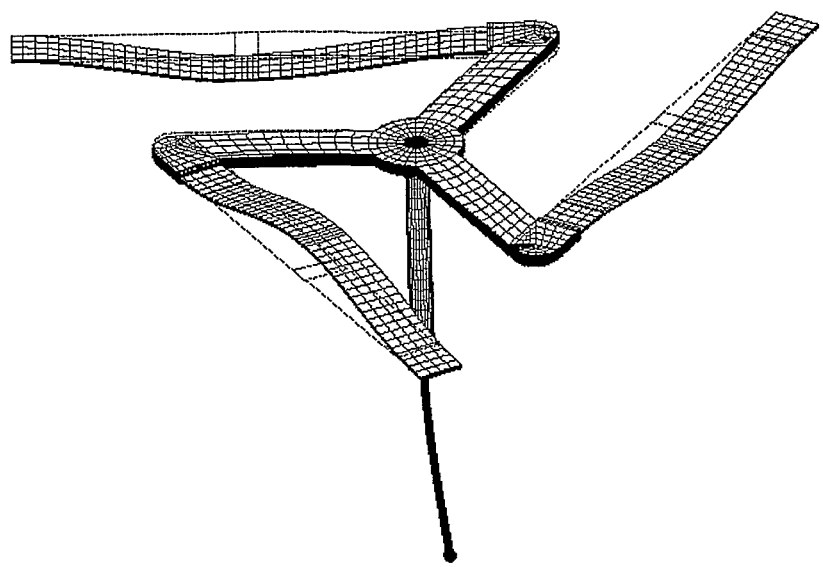
Figure 8:
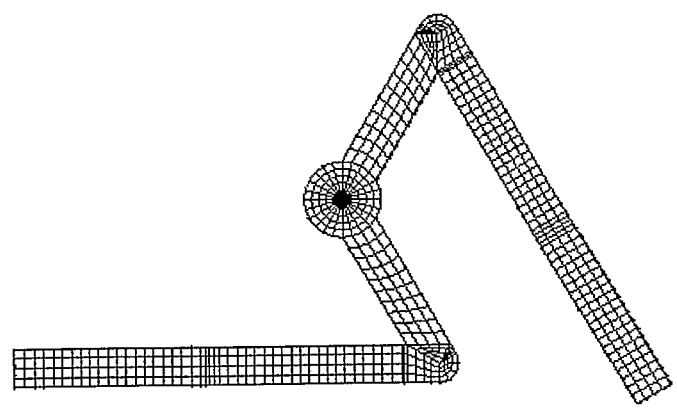
Figure 9:
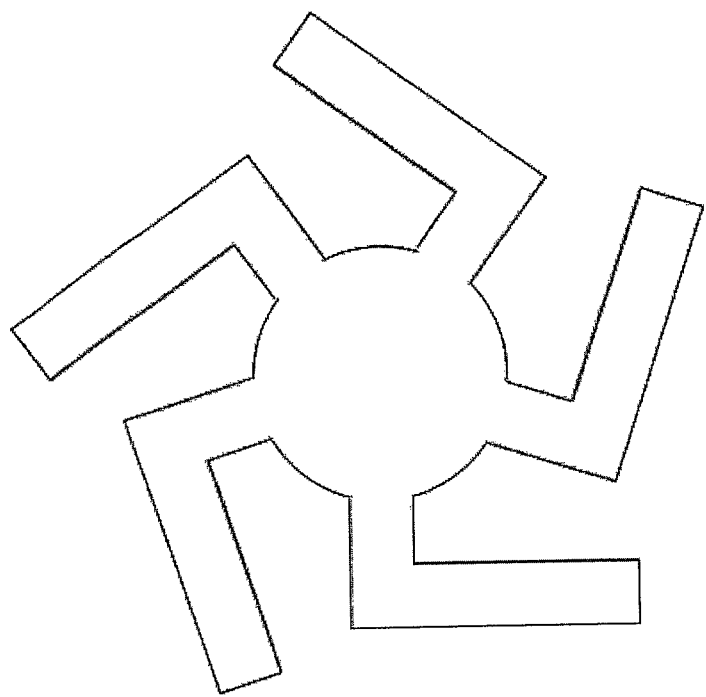

FIGS. 5, 6 and 7 are diagrams illustrating operation of the flexure of FIGS. 1 and 2; and FIGS. 8 and 9 are plan views of alternate embodiments of the present invention.

DETAILED DESCRIPTION

FIGS. 1 and 2 are perspective views of a microprobe according to an embodiment of the present invention.

The microprobe 10 includes a plurality of flexures 20a, 20b, 20c and a probe 30. The flexures are aligned in a plane and meet at a point 40 at which the probe 30 is connected.

Each flexure 20a, 20b, 20c includes at least one actuator 21a, 21b, 21c and at least one sensor 22a, 22b, 22c.

It will be appreciated that the number of actuators and sensors per flexure may vary. In the preferred embodiment illustrated in FIG. 1, there are two actuators interposed between two sensors per flexure, one of the sensors being positioned on or in the flexure at a point adjacent the meeting point 40 at which the probe 30 is connected and the other being on or in the flexure adjacent a free end of the flexure 23.

Preferably, both the actuator and sensor are piezo-electric elements.

The piezo-electric elements may be of a piezo-electric material such as PZT (lead zirconate titanate).

Figure 3:
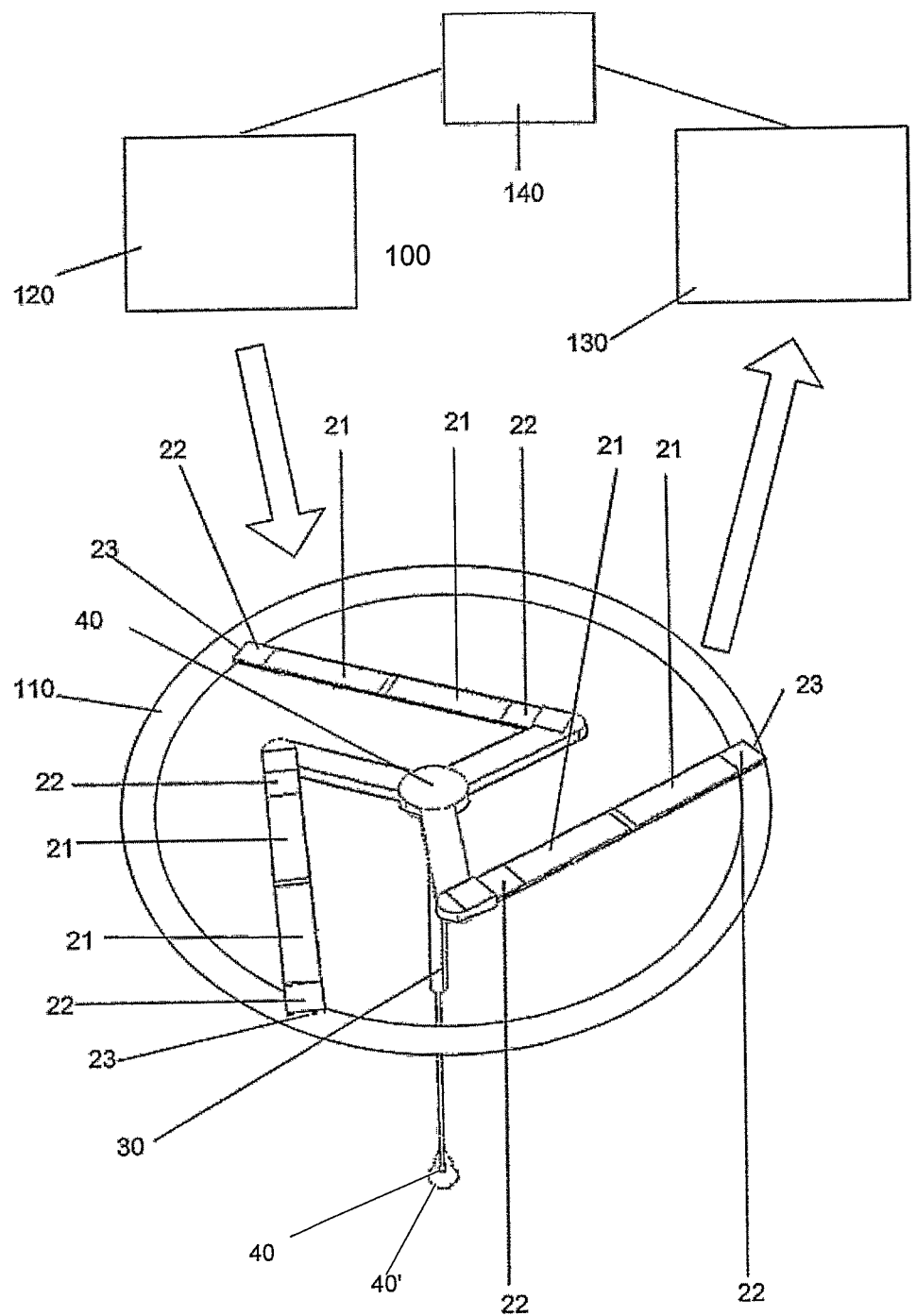
FIGS. 3 and 4 are schematic diagrams illustrating embodiments of a measurement system according to the present invention.

FIG. 3 is a schematic diagram of a measurement system according to an embodiment of the present invention.

The measurement system 100 includes a microprobe 10 (such as the microprobe discussed with reference to FIG. 1) mounted to a support 110 at the free ends 23 of its flexures 20. A voltage source 120 is connected to the actuators 21 of the microprobe and a control system 130 is connected to the sensors 22 of the microprobe.

The microprobe can be controlled via the voltage source 120 to oscillate the probe 30 to create a virtual probe tip (illustrated by the dotted line 30'). The flexures 20 can also be flexed by application of an appropriate voltage from the voltage source 120 so as to move the probe 30 and virtual probe tip 30'.

Figure 4:
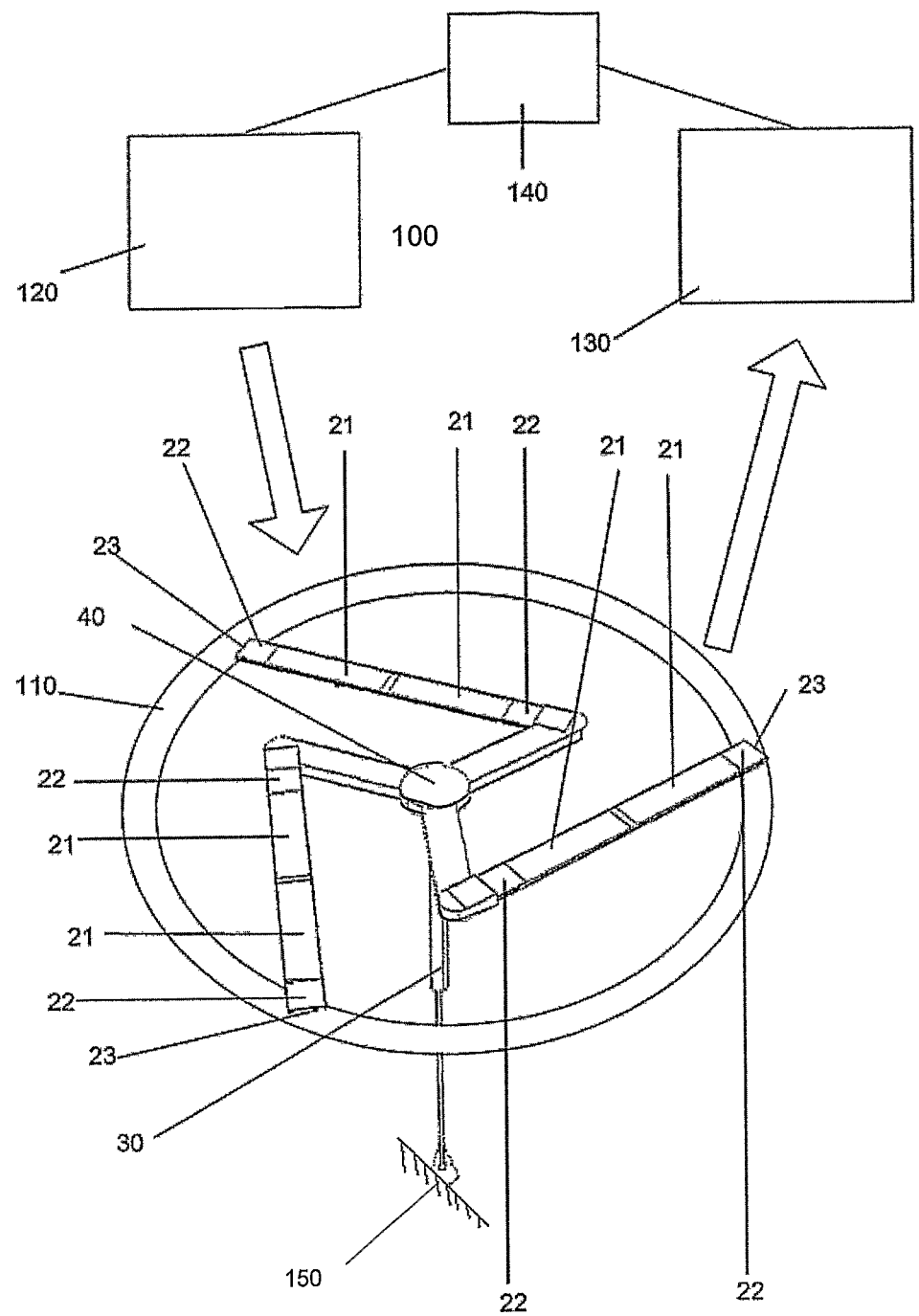

If the virtual probe tip encounters a surface, edge or other artefact, as illustrated in FIG. 4, this causes a change in amplitude and/or phase and/or frequency of vibration of the flexures, which can be detected by the respective sensors 22. Depending on the particular amplitude and/or phase and/or frequency change sensed at each of the sensors, the position and other parameters of the surface, edge, protrusion or the like with respect to the virtual probe tip can be measured.

FIGS. 5, 6 and 7 are diagrams illustrating the microprobe of FIG. 1 when in use. In use, the flexures 20, 20b, 20c of the microprobe 10 are fixed to a support at their exposed end points 23a, 23b, 23c.

Each actuator is connected to a power source via a controller (not shown). The controller is able to flex each of the flexures 20a, 20b, 20c via application of an appropriate voltage to its respective actuator 21a, 21b, 21c. Actuators may be applied to both upper and lower sides of the flexure or just one side depending on the particular configuration. An optional DC voltage can be applied to raise or lower each flexure or flexure portion and a sinusoidal voltage is applied to cause oscillation/vibration. In the illustrated embodiment, the sinusoidal voltage is controlled or configured such that there is a phase angle offset of 120 degrees between adjacent flexures.

Flexing of the respective flexure 20a, 20b, 20c in turn causes the centre point 40 to shift out of plane and thereby moves the microprobe 30 and its tip 31. Such an operation is illustrated in FIGS. 5, 6 and 7 (note that the non-flexed position is shown for reference by dotted lines).

Typically, when the microprobe 30 is to be used to measure an object, the trajectory of the microprobe 30 is controlled via a Co-ordinate Measurement Machine (CMM) 140. The CMM 140 may optionally control the voltage applied to the actuators 21a, 21b, 21c. Using appropriate mapping information from a Computer Aided Design (CAD) file (or by touch trigger scanning), the microprobe is moved along the trajectory and sensing data from the respective sensors 22a, 22b, 22c is recorded and optionally correlated expected surface data from the CAD file or the like.

Once any pre-existing flexing of the flexures due to the drive from the actuators 21a, 21b, 21c has been discounted, the force due to interaction of the probe tip 31 with the surface to be measured can be accurately determined Preferably, the probe 30 comprises a probe tip 31 and a probe stylus 32.

In a preferred embodiment of the present invention, the probe stylus 32 includes an upper portion 32a which is thicker than the lower portion 32b. The upper portion 32a may be of a 50 micron radius and 1 mm long, whilst the lower portion may have a 15 micron radius and be 1 mm long.

In one embodiment, each flexure may be formed of a first leg part and a second leg part. In one embodiment, the first leg part is 1 mm long by 0.2 mm wide and 15 microns thick whilst the second leg part is 2 mm long by 0.2 mm wide by 10 microns thick. In this arrangement, the first leg part may be substantially non-flexible whilst the second leg part forms the flexible portion of the flexure. Other measurements and configurations are of course possible.

Preferably, the actuators comprise piezo-electric elements of approximately 0.95 mm long by 0.2 mm wide by 2 microns thick whilst the sensors comprise piezo-electric elements of 0.2 mm long by 0.2 mm wide by 2 microns thick.

Preferably, the probe tip is spherical in shape and has a 25 micron radius.

Each flexure may be formed of a plastics material, nickel, glass carbon, silicon, or other materials with suitable elastic properties.

It will be appreciated that the number of flexures could be varied depending on the desired application. For example, embodiments of the present invention with two flexures could be used (as illustrated in FIG. 8) or more flexures (such as 5 as illustrated in FIG. 9).

The chequered pattern used in FIGS. 5 to 8 is not intended to portray specific features of those embodiments, it is simply an artefact of the 3D CAD image from which those Figures were produced.

The invention claimed is:

1. A microprobe including a single probe tip mounted at a meeting point of each of a first end of a plurality of flexures, while a free end of each of the one or more flexures is in contact with a support, whereby the probe tip is moveable upon flexing of one or more of the flexures, each flexure further comprising one or more actuators controllable to flex the flexure and one or more sensors arranged to sense flexing of the flexure.

2. A microprobe as claimed in claim 1, further comprising mounting means at the opposing end of the flexures to that of the mounting point for mounting the microprobe to a support.

3. A microprobe as claimed in claim 1, comprising 3 flexures each diverging from the meeting point.

4. A microprobe as claimed in claim 3, wherein the angle between each flexure and the next respective flexure at the meeting point is approximately 120°.

5. A microprobe as claimed in claim 1, wherein the flexures are substantially co-planar when non-flexed.

6. A microprobe as claimed in claim 1, wherein each of the sensors is arranged to sense a change in one or more of amplitude, phase and/or frequency of vibration of its respective flexure.

7. A microprobe as claimed in claim 1, further comprising a probe stylus wherein the probe tip is mounted to the probe stylus, the probe stylus being mounted to the meeting point.

8. A microprobe as claimed in claim 7, wherein the probe stylus includes an upper portion which is thicker than the lower portion.

9. A microprobe as claimed in claim 1, wherein the probe tip is substantially spherical.

10. A microprobe as claimed in claim 1 wherein the probe tip has approximately a 25 micron radius.

11. A microprobe as claimed in claim 1, further comprising interface means for interfacing with a micro Co-ordinate Measurement system.

12. A microprobe as claimed in claim 1, wherein each actuator includes a piezo-electric element.

13. A microprobe as claimed in claim 1 wherein each sensor includes a piezo-electric element.

14. A microprobe as claimed in claim 1, wherein each flexure comprises a first leg, part and a second leg part, the first leg part being substantially non-flexible and the second leg part forming the flexible portion of the flexure.

15. A microprobe as claimed in claim 1, wherein the or each flexure is formed from a selected one of plastic, nickel, glass carbon, silicon, or another material with a similar elastic modulus.

16. A measurement method comprising:
provoding a probe including a single probe tip mounted at a meeting point of each of a first end of a plurality of flexures, while a free end of each of the one or more flexures is in contact with a support, whereby the probe tip is moveable upon flexing of one or more of the flexures, each flexure further comprising one or more actuators controllable to flex the flexure and one or more sensors arranged to sense flexing of the flexure;

applying a drive signal to one or more of the actuating elements to cause the probe tip to oscillate in a defined path creating a virtual probe tip;

monitoring one or more of the sensors to identify interaction of the virtual probe tip with a surface, the interaction producing a change in the output signal from one or more of the sensors; and, interpreting the output signals from the sensors to obtain information on probing force and contact direction.

17. A measurement system comprising:

a microprobe mounted to a support, the microprobe including a single probe tip mounted at a meeting point of each of a first end of a plurality of flexures, while a free end of each of the one or more flexures is in contact with a support, whereby the probe tip is moveable upon flexing of one or more of the flexures, each flexure further comprising one or more actuators controllable to flex the flexure and one or more sensors arranged to sense flexing of the flexure, the microprobe being mounted to the support at a free end of each of the flexures, the measurement system further comprising a control system and a voltage source, the voltage source being connectable to the actuators for flexing the flexures and the control system being arranged to communicate with the sensors to receive data on sensing of flexing.

18. A measurement system according to claim 17, wherein the control system is arranged to control the voltage source to flex the flexure to move the probe tip in a predetermined path.

19. A microprobe including a single probe tip mounted at a meeting point of each of a first end of a plurality of flexures, while a free end of each of the one or more flexures is in contact with a support, whereby the probe tip is moveable upon flexing two or more of the flexures, each flexure further comprising one or more actuators controllable to flex the flexure and one or more sensors arranged to sense flexing of the flexure.

20. A microprobe as claimed in claim 19, comprising 3 flexures each diverging from the meeting point.

* * * * *